US011940723B2

(12) United States Patent
Stone et al.

(10) Patent No.: US 11,940,723 B2
(45) Date of Patent: Mar. 26, 2024

(54) CONTACTLESS CAMERA PRIVACY SHUTTER ASSEMBLY

(71) Applicant: ZEBRA TECHNOLOGIES CORPORATION, Lincolnshire, IL (US)

(72) Inventors: Lawrence Allen Stone, Austin, TX (US); David William Reber, Cedar Park, TX (US); Dennis Barrett, Allen, TX (US)

(73) Assignee: Zebra Technologies Corporation, Lincolnshire, IL (US)

(*) Notice: Subject to any disclaimer, the term of this patent is extended or adjusted under 35 U.S.C. 154(b) by 0 days.

(21) Appl. No.: 17/185,485

(22) Filed: Feb. 25, 2021

(65) Prior Publication Data

US 2022/0269149 A1 Aug. 25, 2022

(51) Int. Cl.
| | | |
|---|---|---|
| *G03B 9/36* | (2021.01) | |
| *G03B 11/04* | (2021.01) | |
| *G03B 17/56* | (2021.01) | |
| *G06F 1/16* | (2006.01) | |
| *H04N 23/55* | (2023.01) | |
| *H04N 23/57* | (2023.01) | |

(52) U.S. Cl.
CPC .............. *G03B 9/36* (2013.01); *G03B 11/041* (2013.01); *G03B 17/565* (2013.01); *G06F 1/1686* (2013.01); *H04N 23/55* (2023.01); *H04N 23/57* (2023.01)

(58) Field of Classification Search
None
See application file for complete search history.

(56) References Cited

U.S. PATENT DOCUMENTS

| | | | |
|---|---|---|---|
| 7,568,848 B2 * | 8/2009 | Ho .......................... | G03B 17/02 359/507 |
| 9,307,129 B2 * | 4/2016 | Oh ......................... | G06F 1/1686 |
| 10,317,776 B2 * | 6/2019 | Gustaveson, II .... | H04N 5/2254 |
| 10,884,459 B1 * | 1/2021 | Chou .................... | G06F 1/1684 |
| 11,143,936 B2 * | 10/2021 | Kanas ................... | G06F 1/1686 |
| 11,178,319 B2 * | 11/2021 | Li .......................... | H04N 5/2254 |
| 11,237,457 B2 * | 2/2022 | Ushio ................... | G03B 11/043 |
| 2007/0269202 A1 * | 11/2007 | Forsyth-Martinez ........................ G03B 17/00 396/448 |
| 2011/0115924 A1 * | 5/2011 | Yu ........................ | G03B 11/043 348/207.11 |
| 2011/0182029 A1 * | 7/2011 | Wu ....................... | G03B 11/043 361/679.55 |
| 2011/0206364 A1 | 8/2011 | Han et al. | |
| 2011/0262125 A1 | 10/2011 | Wang et al. | |

(Continued)

OTHER PUBLICATIONS

Novelty Search Report for Belgian Patent Application No. 2022/5136 dated Nov. 30, 2022.

*Primary Examiner* — Rodney E Fuller (57) ABSTRACT

A computing device includes: a housing supporting a transparent panel to define an enclosure; a camera supported within the enclosure, the camera having a field of view extending through the transparent panel; and a privacy shutter supported within the enclosure, between the transparent panel and the camera, the privacy shutter having a shutter magnet, and being movable via magnetic activation between (i) an enabled position obstructing the field of view, and (ii) a disabled position clearing the field of view.

21 Claims, 10 Drawing Sheets

(56) References Cited

U.S. PATENT DOCUMENTS

| | | | |
|---|---|---|---|
| 2015/0009399 A1* | 1/2015 | Jonsson | G03B 11/041 |
| | | | 348/373 |
| 2016/0161830 A1* | 6/2016 | Gonzalez Sanchez | ...................... |
| | | | G03B 11/04 |
| | | | 396/448 |
| 2018/0004068 A1* | 1/2018 | Chen | G06F 1/1605 |
| 2018/0059510 A1* | 3/2018 | Gustaveson, II | G06F 1/1686 |
| 2018/0109712 A1 | 4/2018 | Robinson et al. | |
| 2019/0129466 A1* | 5/2019 | Zeng | H04N 5/2257 |
| 2019/0369462 A1* | 12/2019 | Krause | G06F 1/1686 |
| 2020/0371406 A1* | 11/2020 | Hung | G03B 11/04 |
| 2021/0149272 A1* | 5/2021 | Li | G03B 11/041 |
| 2021/0200061 A1* | 7/2021 | Kanas | G03B 11/043 |
| 2021/0208478 A1* | 7/2021 | Kanas | G06F 1/1686 |
| 2021/0333686 A1* | 10/2021 | Park | G03B 11/041 |

\* cited by examiner

CONTACTLESS CAMERA PRIVACY SHUTTER ASSEMBLY

BACKGROUND

Certain devices with integrated cameras, such as tablet computers, laptop computers and the like, include privacy shutters. A privacy shutter is generally physically enabled by an operator of device, to obscure a camera's field of view such that the camera cannot capture images of the surrounds of the device, whether or not the camera is enabled (e.g. via malicious software, operator error or the like).

Privacy shutters, however, may not be suitable for implementation in devices with cameras mounted behind glass panels. In such implementations, the shutter may necessitate openings in the glass panel through which dust and/or water may enter.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a computing device including: a housing supporting a transparent panel to define an enclosure; a camera supported within the enclosure, the camera having a field of view extending through the transparent panel; and a privacy shutter supported within the enclosure, between the transparent panel and the camera, the privacy shutter having a shutter magnet, and being movable via magnetic activation between (i) an enabled position obstructing the field of view, and (ii) a disabled position clearing the field of view.

Additional examples disclosed herein are directed to a privacy shutter assembly for a computing device, the privacy shutter assembly comprising: a privacy shutter supported within an enclosure formed by a housing and a transparent panel of the computing device, the privacy shutter having a shutter magnet, and being movable between (i) an enabled position obstructing a camera field of view of the computing device, and (ii) a disabled position clearing the camera field of view; and a shutter actuator supported outside the enclosure by the housing, the shutter actuator having an actuator magnet movable between (i) a first position to transition the shutter magnet to one of the enabled position and the disabled position, and (ii) a second position to transition the shutter magnet to the other of the enabled position and the disabled position.

Further examples disclosed herein are directed to a computing device, comprising: a housing supporting a transparent panel to define an enclosure; a camera supported within the enclosure, the camera having a field of view extending through the transparent panel; a magnetic privacy shutter rotatably supported within the enclosure between (i) a resting position obstructing the field of view, and (ii) a disabled position clearing the field of view; a magnetic shutter actuator slidably supported outside the enclosure between (i) a first position to magnetically attract the privacy shutter to the disabled position, and (ii) a second position to permit the privacy shutter to return to the resting position.

Figure 1:
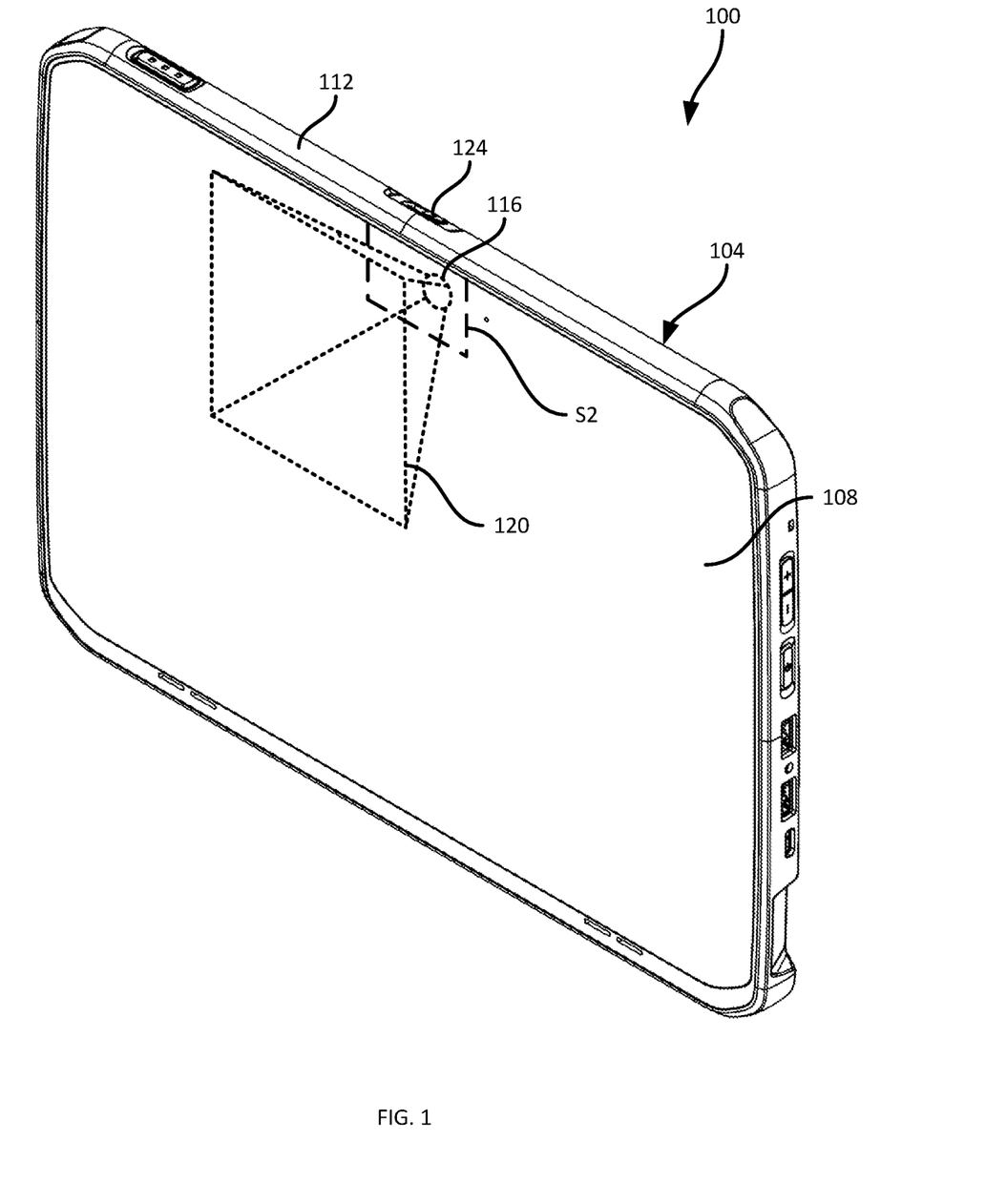
FIG. 1 is an isometric view of a computing device.

FIG. 1 illustrates a computing device 100 (also referred to herein as the device 100), such as a tablet computer. In other examples, the device 100 can be a laptop computer, a smart phone, an all-in-one desktop computer, or the like.

The device 100 includes a housing 104 that supports various other components of the device 100, including a transparent panel 108, such as a glass panel forming the exterior layer of a touch screen, with a display supported behind the panel 108. As seen in FIG. 1, in the illustrated example the panel 108 occupies substantially the entire front (i.e. operator-facing) side of the device 100. The housing 104 and the panel 108 together define an enclosure within which are contained a variety of other components of the device 100. The enclosure may, in some examples, be sealed against ingress by dust and/or water, e.g. by seals between the panel 108 and a perimeter wall 112 of the housing 104.

Among the components of the device 100 contained within the enclosure is a camera 116, which is mounted behind the panel 108 such that a field of view (FOV) 120 of the camera 116 extends through the panel 108. The camera 116 may therefore also be referred to as a front-facing camera. The device 100 may also include a rear camera on an opposite side of the device 100.

The device 100 also includes, as will be discussed in greater detail below, a privacy shutter for the camera 116. The privacy shutter enables an operator of the device 100 to obstruct the FOV 120 of the camera 116, such that the camera 116 is prevented from captured images of the operator or the operator's surroundings, regardless of whether the camera 116 is enabled. The privacy shutter is not visible in FIG. 1, because the shutter is mounted within the enclosure defined by the housing 104 and the panel 108. In particular, the shutter is mounted between the panel 108 and the camera 116.

The shutter is operated via physical manipulation of a shutter actuator 124 that is accessible from the exterior of the housing 104. In particular, the actuator 124 resides entirely outside of the enclosure, and therefore does not directly contact the shutter. Instead, the shutter and the actuator 124 each include magnetic elements that interact in response to movement of the actuator 124 to transition the shutter between an enabled position (obstructing the FOV 120 of the camera 116) and a disabled position (clearing the FOV 120).

Figure 2:
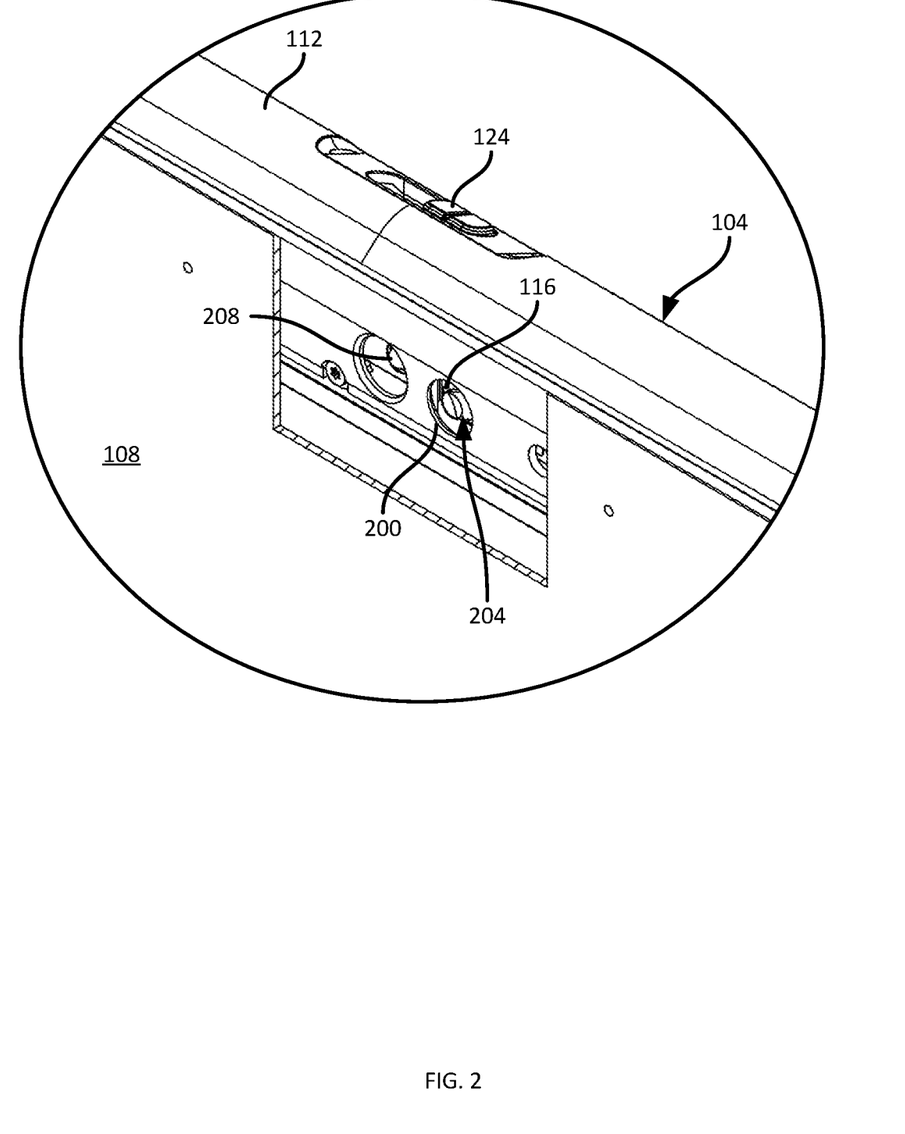
FIG. 2 is a detail view of a portion of the computing device of FIG. 1.

Turning to FIG. 2, a detailed view of a portion of the device 100 is shown, with a section of the panel 108 removed as indicated by the section "S2" in FIG. 1. The omitted section of the panel 108 reveals an opening 200 in an interior portion of the housing 104, revealing the camera 116, as well as a shutter 204, as mentioned above. The shutter 204 is shown in the enabled position, in which the shutter 204 obstructs the FOV 120 of the camera 116. In the illustrated example, the device 100 can also include a light source 208 behind the panel 108, such as a light emitting diode (LED) for use as a flash, IR light source, or the like. As will be discussed in greater detail below, the shutter 204 is disposed within the enclosure defined by the housing 104 and the panel 108, adjacent to the perimeter wall 112. The actuator 124, in turn, is supported on an outer surface of the housing 104 so as to be accessible from the exterior of the device 100. The actuator 124, more specifically, as disposed on an outer surface of the perimeter wall 112, adjacent to the camera 116 (and therefore to the shutter 204). The physical proximity of the shutter 204 and the actuator 124 enable magnetic components of the actuator 124 and the shutter 204 to interact without direct contact, to enable or disable the shutter 204.

Figure 3:
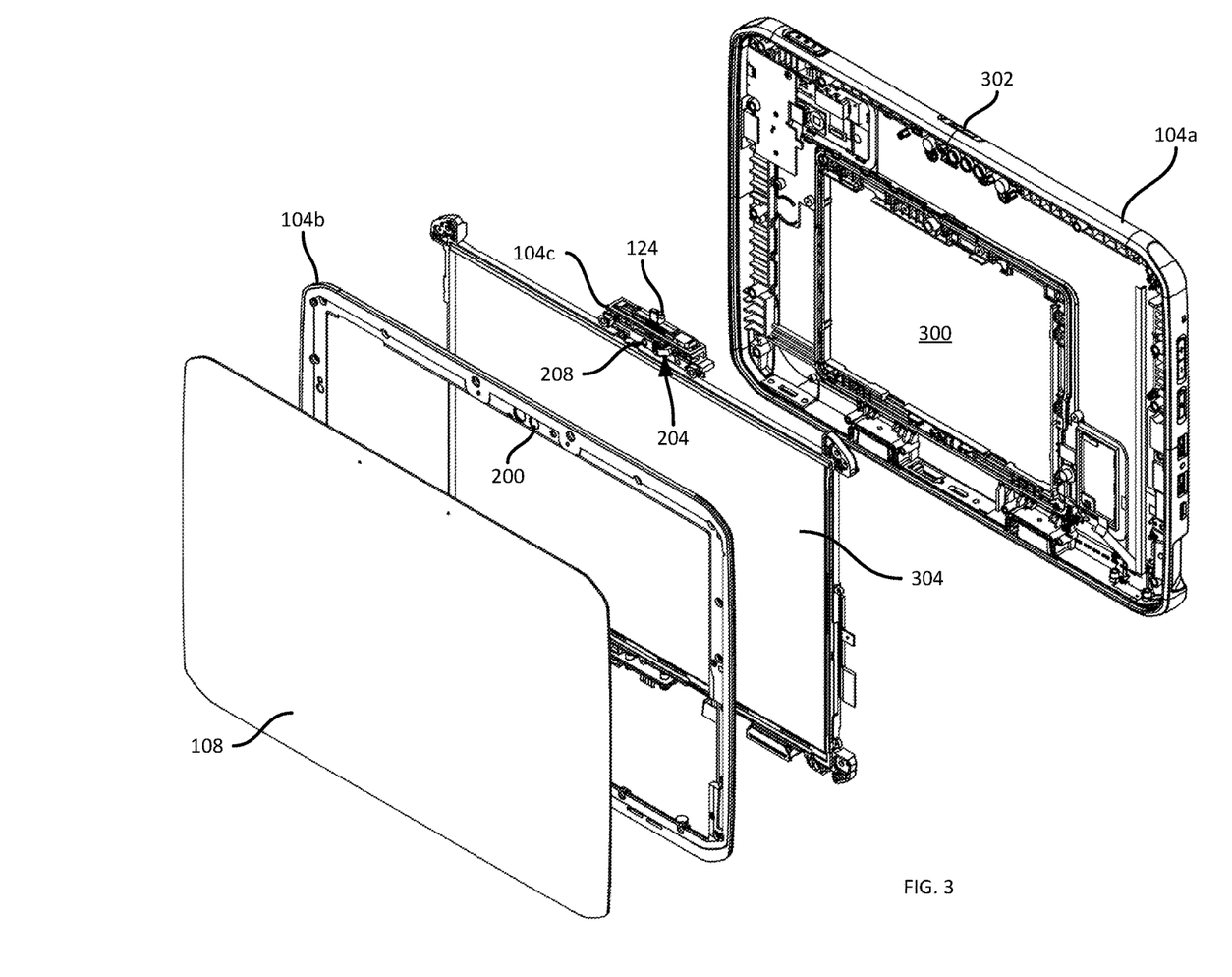
FIG. 3 is an exploded view of the computing device of FIG. 1.

Turning to FIG. 3, a partially exploded view of the device 100 is shown. The housing 104 includes an outer housing 104a, defining a back of the device 100 and supporting logic boards, controllers and the like on an inner surface 300 thereof. The outer housing 104a includes an opening 302 therethrough, enabling access to the actuator 124. The opening 302 does not, however, enable access to the enclosure defined by the housing 104 and the panel 108.

The housing 104 also includes a bezel 104b configured to seal the panel 108 against the outer housing 104a, and to retain a display panel 304 against the outer housing 104a. Further, the housing 104 includes an internal housing 104c, also referred to as a frame 104c, that carries the shutter 204 and the actuator 124. The internal housing 104c, in other words, defines a portion of the boundary between the enclosure and the exterior of the device 100. The shutter 204 is supported on one side of the above boundary, while the actuator 124 is supported on the other side of the boundary. In this example, the internal housing 104c also supports the camera 116 and light source 208.

Figure 4:
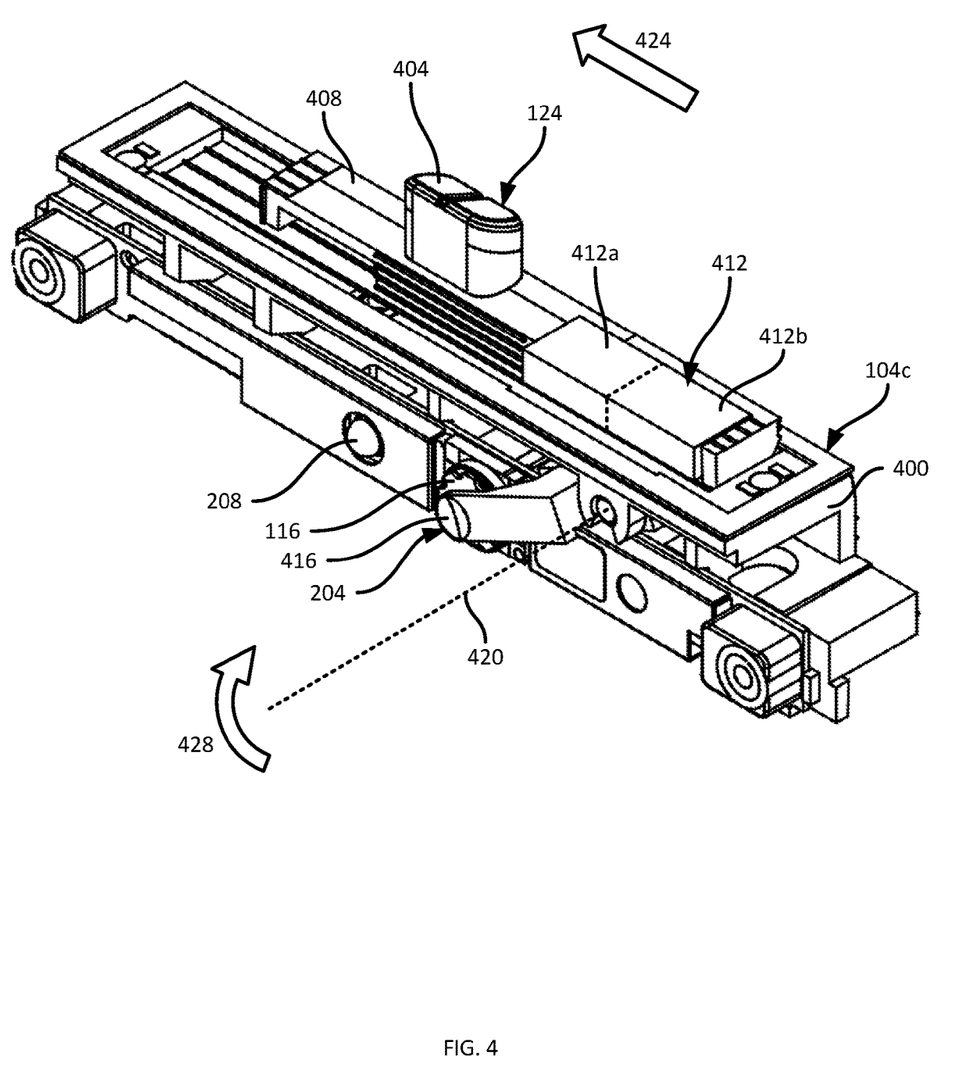
FIG. 4 is an isometric view of a privacy shutter assembly of the computing device of FIG. 3.

Turning to FIG. 4, the shutter 204, actuator 124, and internal housing 104c are shown in isolation. The internal housing 104c includes a boundary wall 400 that movably supports the actuator 124 on an outer surface thereof, such that a contact surface 404 of the actuator 124 extends through the opening 302 for manipulation by an operator of the device 100, when the device 100 is fully assembled. The boundary wall 400 also engages with the outer housing 104a to divide the enclosure inside the device 100 from the exterior of the device 100.

The actuator 124 includes, in addition to the contact surface 404, a body 408 from which the contact surface 404 extends upwards. The body 408 is movably supported on the internal housing 104c. In this example, the body 408 is slidable on the internal housing 104c between a first position, shown in FIG. 4, and a second position discussed later herein. The actuator 124 also includes a magnet 412 (e.g. a neodymium boron or other rare-earth magnet) supported by the body 408, and therefore also movable between the first and second positions mentioned above. The magnet 412, in this example, includes two opposite poles 412a and 412b. The shutter 204 also includes a magnet, to be discussed below, of which one pole (with opposite polarity to the pole 412a of the magnet 412) faces the actuator 124.

The shutter 204 is movable between the enabled position shown in FIG. 4, and a disabled position in which a tab 416 of the shutter 204 is lifted away from the camera 116. In this example, movement of the shutter 204 is enabled by rotation of the shutter 204 about an axis 420 defined by the interior housing 104c. That is, the shutter 204 can rotate upwards from the position shown in FIG. 4, towards the actuator 124. Such rotation is driven by interaction between the magnet 412 of the actuator 124, and the magnet of the shutter 204.

In particular, with the actuator 124 in the first position as shown in FIG. 4, the pole 412a is closest to the magnetic element of the shutter 204. The shutter 204 is therefore not attracted to the actuator 124 (and can be, in fact, repelled by the magnet 412). As a result, the shutter 204 remains in the enabled position shown. When the actuator 124 is manipulated to slide in a direction 424 to the second position, the pole 412a is shifted further away from the shutter 204, while the pole 412b is shifted closer to the shutter 204. The pole 412b attracts the magnetic element of the shutter 204, and thus rotates the shutter 204 in a direction 428 about the axis 420, raising the tab 416 away from the camera 116. As will now be apparent, sliding the actuator 124 in a direction opposite from the direction 424 returns the magnet 412 to the position shown in FIG. 4, enabling the shutter 204 to return to the enabled position, e.g. by repulsion between the pole 412a and the magnet of the shutter 204, or simply by a lack of attraction between the pole 412b and the magnet of the shutter 204 resulting from increased distance between such components.

Figure 5:
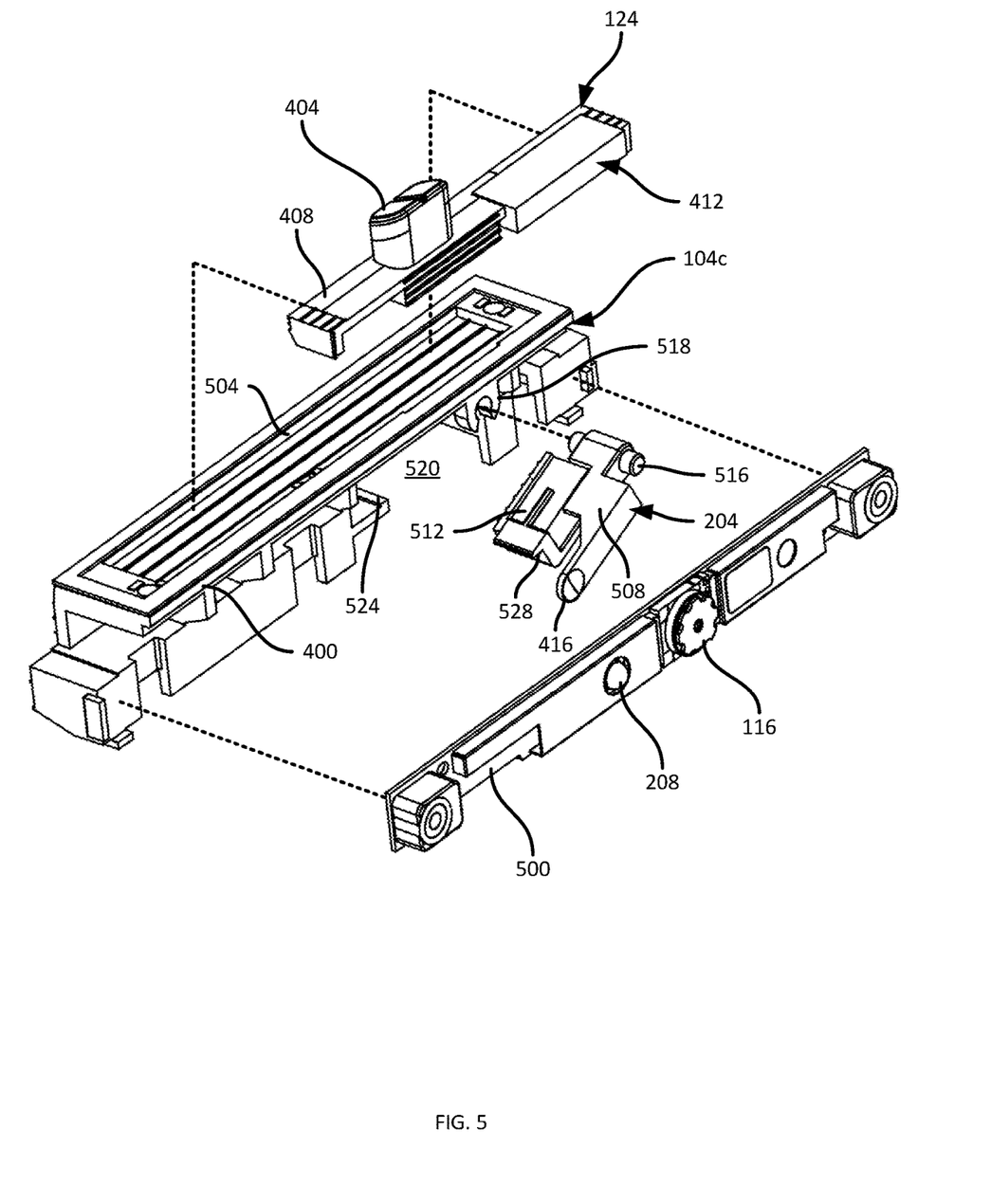
FIG. 5 is an exploded view of the privacy shutter assembly of FIG. 4.

FIG. 5 illustrates an exploded view of the assembly shown in FIG. 4. In particular, as shown in FIG. 5 the camera 116 and light source 208 can be mounted on a support member 500 (e.g. a PCB or the like) which is in turn mounted to the internal housing 104c. The actuator 124, as noted above, rests on an upper surface 504 of the internal housing 104c. The shutter 204 is also illustrated in greater detail. The shutter 204 includes a carriage 508 supporting a magnet 512 (e.g. a neodymium boron or other rare-earth magnet), with one pole facing upwards (towards the actuator 124) and the other pole facing downwards, away from the actuator 124. The shutter 204 also includes an axle 516 extending from the carriage 508 to engage with a hub 518 of the internal housing 104c, enabling rotation of the shutter 204 about the axis 420 shown in FIG. 4. The internal housing 104c can include more than one hub element 518 in some examples.

As seen in FIG. 5, the tab 416 lies on the forward side of the support 500 and camera 116, while the remainder of the shutter 204 is disposed behind the support 500. The internal housing 104c defines a cavity 520 within which the shutter 204 rotates about the axle 516. The upper extent of the range of motion of the shutter 204, towards the actuator 124, is thus defined by the boundary wall 400. The lower extent of the range of motion of the shutter 204 is defined, in this example, by a stop 524 extending into the cavity 520 from the internal housing 104c. The shutter 204 includes a ledge 528 extending from the carriage 508, and configured to engage with the stop 524 to prevent the shutter 204 from rotating beyond the enabled position shown.

Figure 6:
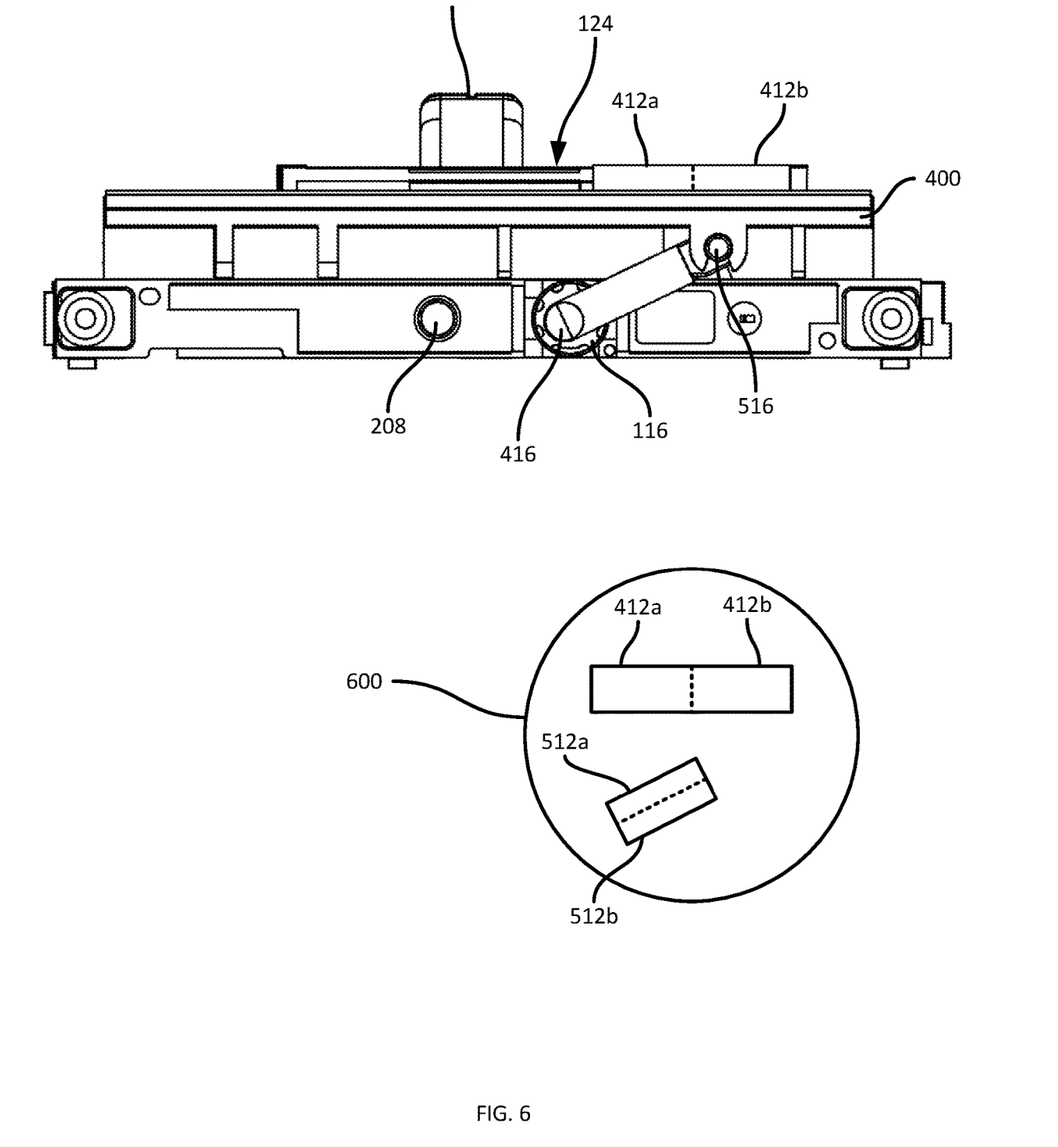
FIG. 6 is a front view of the privacy shutter assembly of FIG. 4, in an enabled position.
Figure 7:
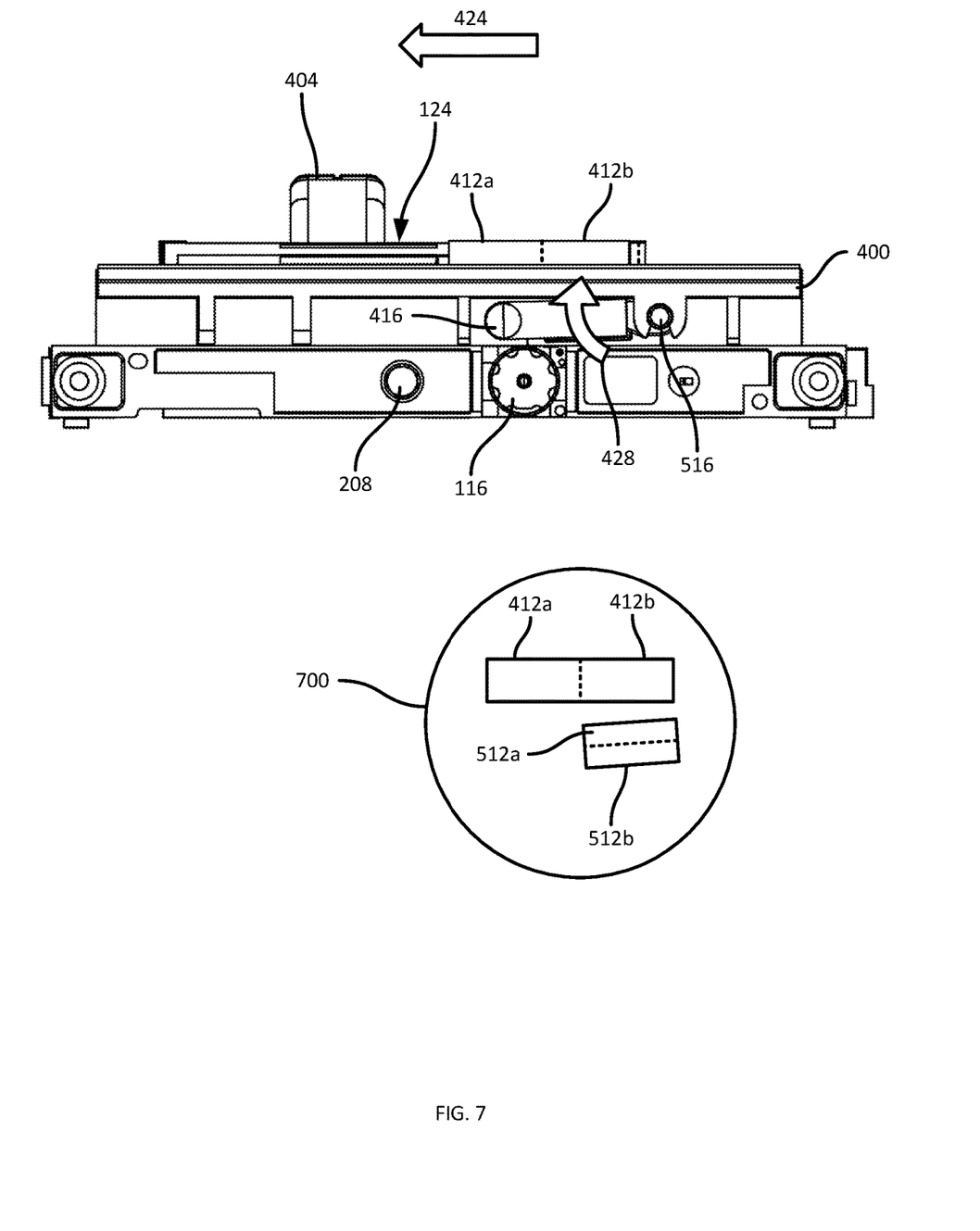
FIG. 7 is a front view of the privacy shutter assembly of FIG. 4, in a disabled position.

FIGS. 6 and 7 illustrate the operation of the actuator 124 and the shutter 204. In particular, FIG. 6 shows a front view of the assembly of FIG. 4, with the actuator 124 in the first position and the shutter 204 in the enabled position, obstructing the camera 116. As seen from the accompanying schematic 600, the magnet 512 of the shutter 204 includes a first pole 512a, with the same polarity as the pole 412a of the magnet 412, and a second pole 512b with the same polarity as the pole 412b of the magnet 412. The pole 512a faces towards the actuator 124, while the pole 512b faces away from the actuator 124.

Thus, when the actuator 124 is in the position shown in FIG. 6, the closest pole of the magnet 412 to the magnet 512 (and particularly, to the pole 512a), is the pole 412a. The pole 412a therefore repels the pole 512a, biasing the shutter 204 towards the enabled position. The shutter 204 therefore remains in the enabled position, with the ledge 528 engaging with the stop 524 to limit downwards movement of the shutter 204.

FIG. 7 illustrates the shutter 204 and actuator 124 following a transition from the enabled position to the disabled position. Sliding of the actuator 124 in the direction 424 shifts the magnet 412 relative to the magnet 512 of the shutter 204. Specifically, as also shown in the schematic 700, the pole 412b of the magnet 412, rather than the pole 412a, becomes the closest portion of the magnet 412 to the magnet 512. Because the polarity of the pole 412b is opposite to that of the pole 512a, the magnet 512 is attracted to the magnet 412, and the shutter 204 rotates in the direction 428 about the axle 516, to the disabled position shown. As will now be apparent, sliding the actuator 124 back to the position shown in FIG. 6 brings the pole 412a of the magnet 412 into proximity with the magnet 512, repelling the magnet 512 and returning the shutter 204 to the enabled position.

In other examples, the shutter 204 and/or a portion of the body 408 of the actuator 124 can be fabricated from magnetic materials, rather than carrying discrete magnets as discussed above. In further examples, the polarities of the magnets can be reversed from those shown above, e.g. such that repulsion of the magnets 412 and 512 places the shutter 204 in the disabled position, rather than the enabled position. In still further examples the magnet 412 can be configured to present only one pole to the magnet 512, and shortened. In such examples, rather than alternately repulsing and attracting the magnet 512, the magnet 412 alternately attracts the magnet 512 strongly enough to rotate the shutter 204, and does not attract the magnet 512 sufficiently to rotate the shutter 204, enabling the shutter 204 to fall to a resting position (e.g. the enabled position).

Figure 8:
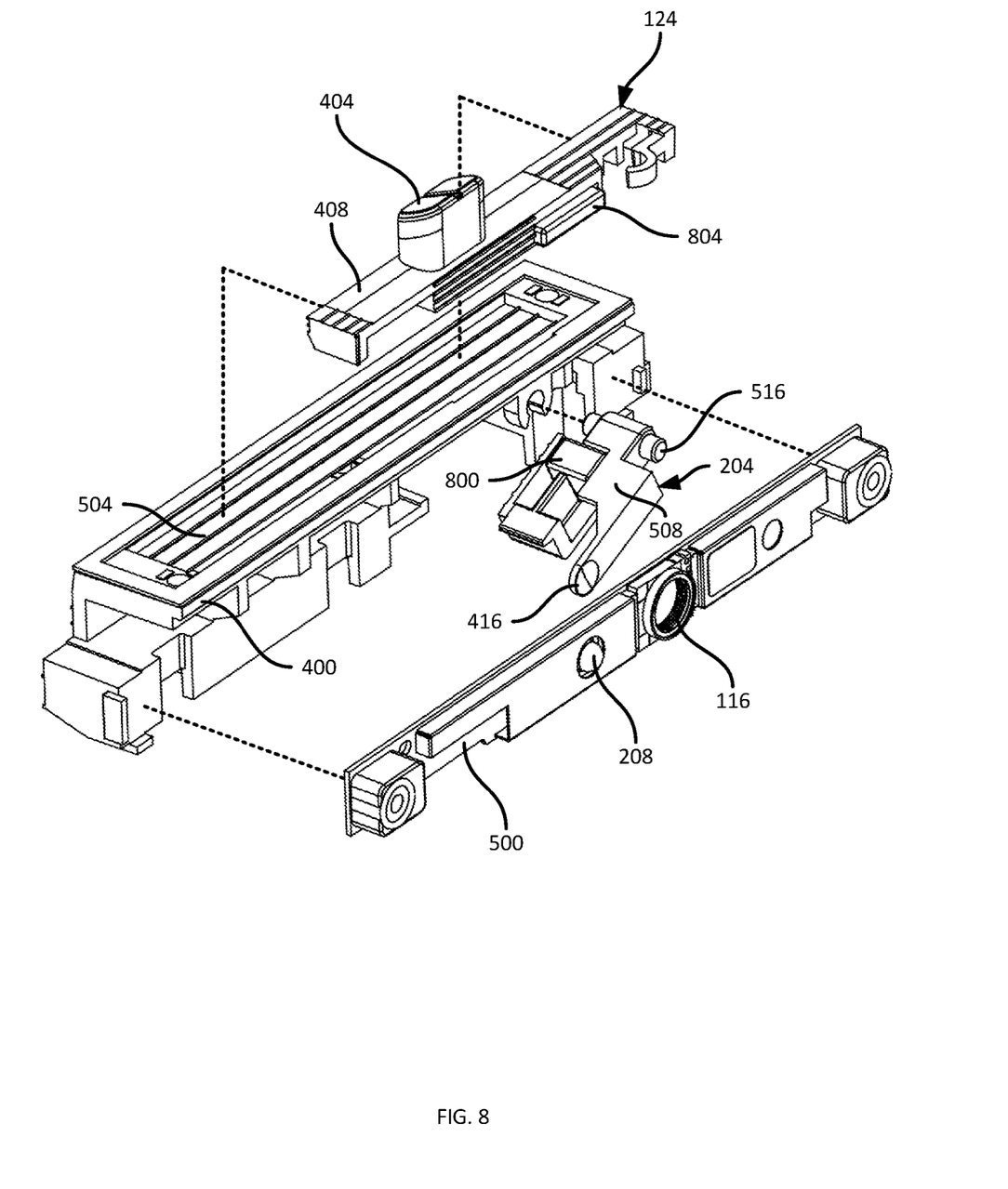
FIG. 8 is an exploded view of another example privacy shutter assembly.
Figure 9:
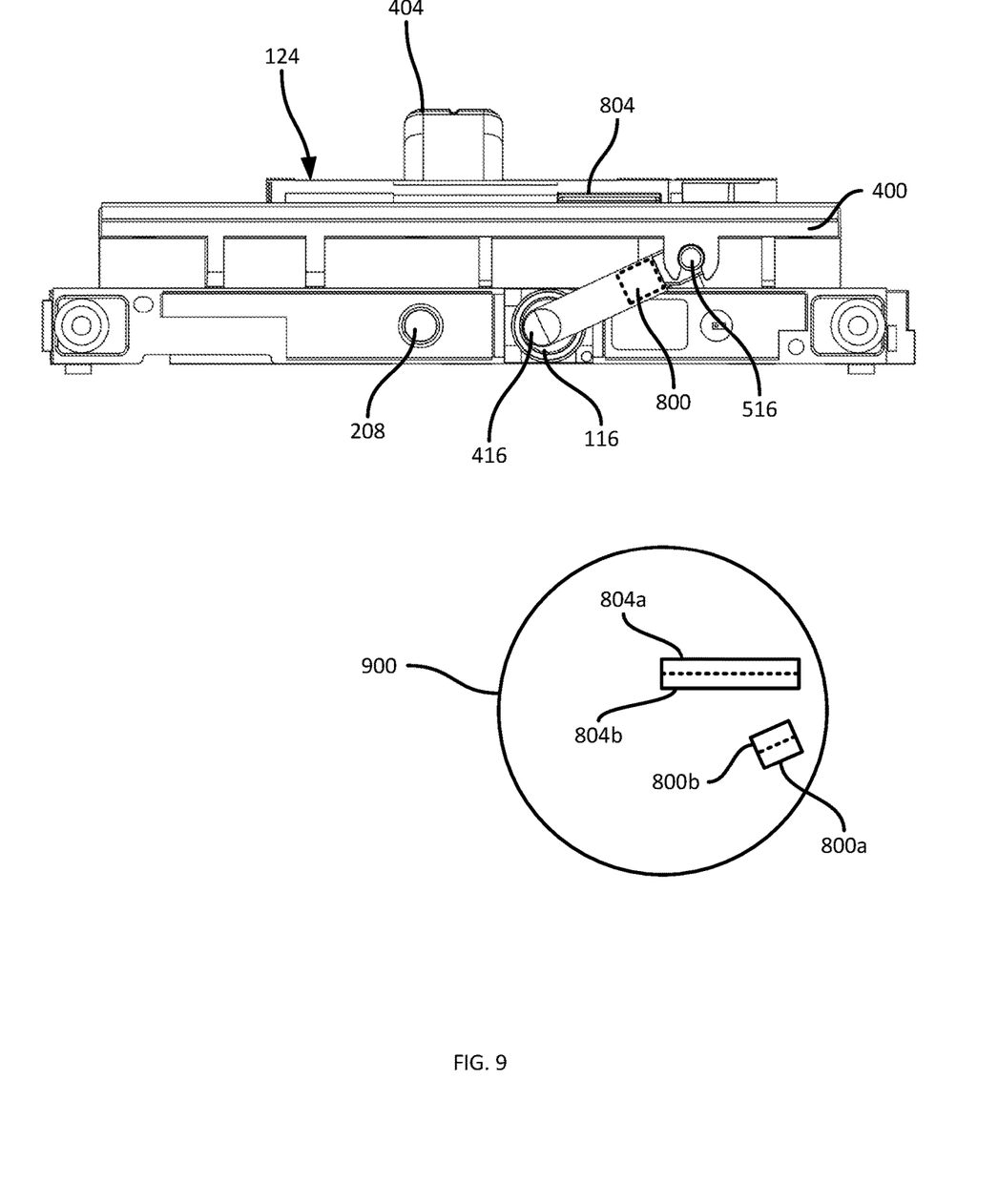
FIG. 9 is a front view of the privacy shutter assembly of FIG. 8, in an enabled position.
Figure 10:
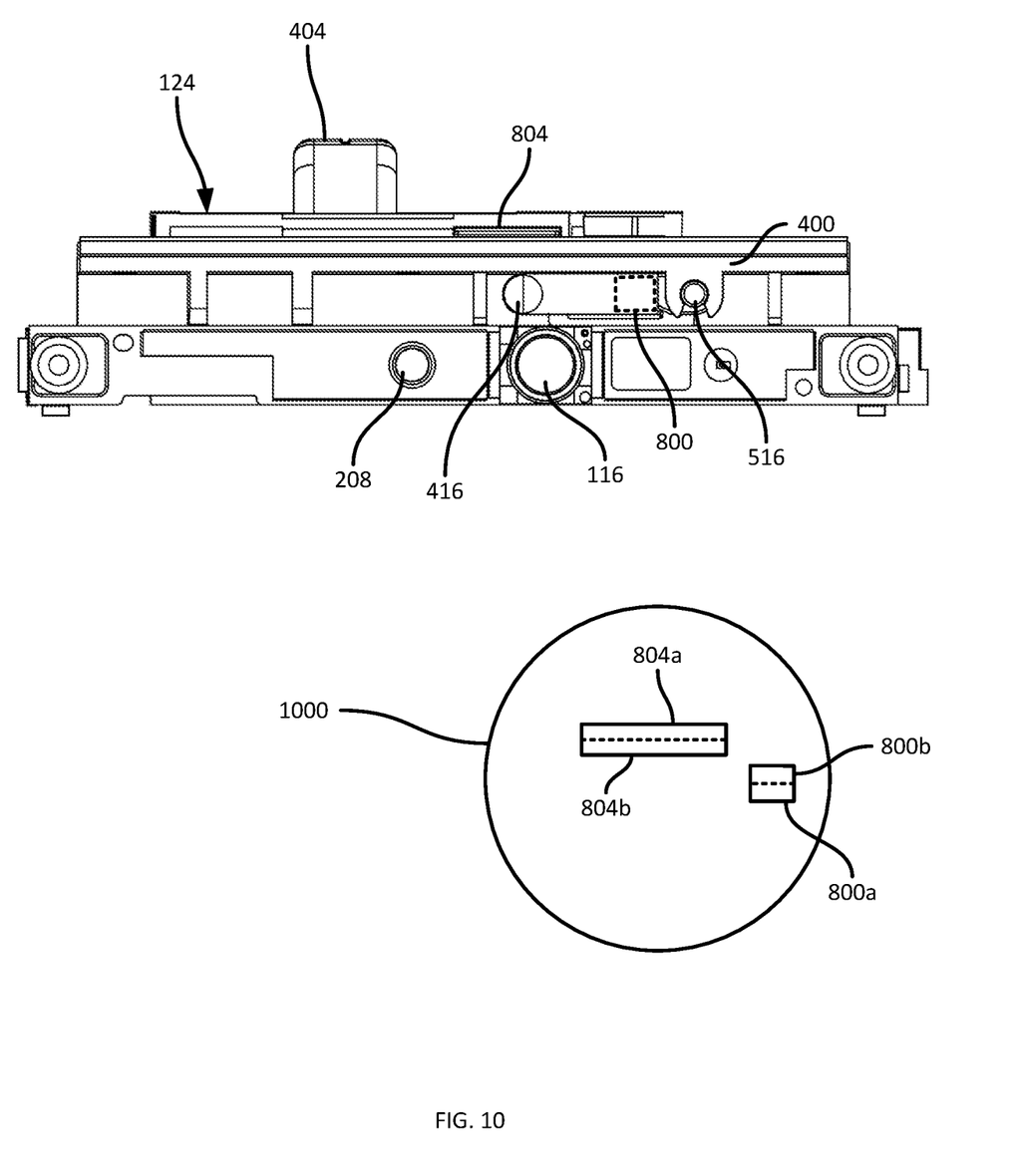
FIG. 10 is a front view of the privacy shutter assembly of FIG. 8, in a disabled position.

FIGS. 8-10 illustrate a further embodiment using the principles set out above, with a different arrangement of magnets than that discussed above. Specifically, as shown in FIG. 8, in this example the shutter 204 includes a magnet 800, and the actuator 124 includes a magnet 804, e.g. embedded in a side and/or bottom of the body 408. FIG. 9 illustrates a front view of the shutter assembly in which the position of the magnet 800 is shown in dashed lines for clarity. As shown in the schematic 900, the magnet 800 includes a first pole 800a and a second pole 800b, while the magnet includes a first pole 804a and a second pole 804b. The poles 800b and 804b, having the same polarity, face each other, and therefore in the illustrated position the magnets 800 and 804 repel one another, maintaining the shutter 204 in the enabled position.

FIG. 10 illustrates the assembly with the shutter 204 in the disabled position. As shown in the schematic 1000, movement of the actuator 124 repositions the magnet 804 such that both poles 804a and 804b, at one end of the magnet 804, are exposed to both poles 800a and 800b, at one end of the magnet 800. Therefore, the pole 804a attracts the pole 800b, while the pole 804b attracts the pole 800a, rotating the magnet 800 to move the shutter 204 into the disabled position.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computing device, comprising:
a housing supporting a transparent panel to define an enclosure;
a camera supported within the enclosure, the camera having a field of view extending through the transparent panel;
a privacy shutter supported within the enclosure, between the transparent panel and the camera, the privacy shutter having a shutter magnet, and being rotationally movable via magnetic activation between (i) an enabled position obstructing the field of view, and (ii) a disabled position clearing the field of view; and
a shutter actuator supported outside the enclosure by the housing, the shutter actuator having an actuator magnet movable between (i) a first position to transition the shutter magnet to one of the enabled position and the disabled position, and (ii) a second position to transition the shutter magnet to the other of the enabled position and the disabled position;
wherein the actuator magnet attracts the shutter magnet when moving to one of the enabled position or the disabled position and the actuator magnet repels the shutter magnet when moving to the other one of the enabled position or the disabled position.

2. The computing device of claim 1, wherein the housing includes a perimeter wall surrounding the transparent panel;
wherein the shutter actuator is supported on an outer surface of the perimeter wall; and
wherein the privacy shutter is supported within the enclosure adjacent to the perimeter wall.

3. The computing device of claim 1, wherein the shutter magnet includes a first pole facing the shutter actuator;
wherein the actuator magnet includes a first pole having an opposite polarity to the first pole of the shutter magnet; and
wherein in the first position, the first pole of the actuator magnet is placed at a first distance from the first pole of the shutter magnet, to attract the shutter magnet and move the privacy shutter to the disabled position.

4. The computing device of claim 3, wherein in the second position, the first pole of the actuator magnet is placed at a second distance from the first pole of the shutter magnet, the second distance greater than the first distance to reduce an attraction between the shutter magnet and the actuator magnet.

5. The computing device of claim 4, wherein the actuator magnet includes a second pole having the same polarity as the first pole of the shutter magnet; and
wherein in the second position, the second pole of the actuator magnet repels the first pole of the shutter magnet to bias the shutter to the enabled position.

6. The computing device of claim 1, wherein the privacy shutter includes a carriage movably mounted within the enclosure and carrying the shutter magnet.

7. The computing device of claim 6, wherein the carriage includes a tab configured to extend into the field of view of the camera when the carriage is in the enabled position.

8. The computing device of claim 6, wherein the carriage is rotatable between the enabled position and the disabled position.

9. The computing device of claim 6, wherein the housing includes a stop within the enclosure to prevent rotation of the carriage beyond the enabled position.

10. The computing device of claim 1, wherein the shutter actuator is slidably mounted on the housing.

11. The computing device of claim 10, wherein the shutter actuator includes a contact surface exposed to an exterior of the computing device, for operation of the shutter actuator.

12. The computing device of claim 1, wherein the housing includes an outer housing defining the perimeter wall, and an interior housing having a boundary wall; and
wherein the interior housing supports (i) the shutter actuator on an outer side of the boundary wall, and (ii) the privacy shutter on an inner side of the boundary wall.

13. The computing device of claim 1, wherein the shutter actuator translates laterally with respect to the shutter.

14. A privacy shutter assembly for a computing device, the privacy shutter assembly comprising:
a privacy shutter supported within an enclosure formed by a housing and a transparent panel of the computing device, the privacy shutter having a shutter magnet, and being rotationally movable between (i) an enabled position obstructing a camera field of view of the computing device, and (ii) a disabled position clearing the camera field of view; and
a shutter actuator supported outside the enclosure by the housing, the shutter actuator having an actuator magnet movable between (i) a first position to transition the shutter magnet to one of the enabled position and the disabled position, and (ii) a second position to transition the shutter magnet to the other of the enabled position and the disabled position;
wherein the actuator magnet attracts the shutter magnet when moving to one of the enabled position or the disabled position and the actuator magnet repels the shutter magnet when moving to the other one of the enabled position or the disabled position.

15. The privacy shutter assembly of claim 14, wherein the privacy shutter includes a tab configured to extend into the camera field of view in the enabled position.

16. The privacy shutter assembly of claim 15, wherein the privacy shutter includes a carriage rotatably mounted within the enclosure, and wherein the tab extends from the carriage.

17. The privacy shutter assembly of claim 14, wherein the shutter actuator is slidably mounted outside the enclosure.

18. The privacy shutter assembly of claim 17, wherein the shutter actuator includes a body supporting the actuator magnet, and a contact surface exposed to an exterior of the computing device, for operation of the shutter actuator.

19. A computing device, comprising:
   a housing supporting a transparent panel to define an enclosure;
   a camera supported within the enclosure, the camera having a field of view extending through the transparent panel;
   a magnetic privacy shutter rotatably supported within the enclosure between (i) a resting position obstructing the field of view, and (ii) a disabled position clearing the field of view;
   a magnetic shutter actuator slidably supported outside the enclosure by the housing between (i) a first position to magnetically attract the privacy shutter to the disabled position, and (ii) a second position to permit the privacy shutter to return to the resting position; wherein the privacy shutter is repelled to the resting position.

20. The computing device of claim 19, wherein the privacy shutter includes a tab disposed between the camera and the transparent panel.

21. The computing device of claim 19, wherein the housing includes a perimeter wall surrounding the transparent panel;
   wherein the shutter actuator is supported on an outer surface of the perimeter wall; and
   wherein the privacy shutter is supported within the enclosure adjacent to the perimeter wall.

\* \* \* \* \*